United States Patent [19]

Chouly et al.

[11] Patent Number: 5,416,801
[45] Date of Patent: May 16, 1995

[54] DIGITAL SIGNAL TRANSMISSION SYSTEM BASED ON PARTITIONING OF A CODED MODULATION WITH CONCATENATED CODINGS

[75] Inventors: Antoine Chouly, Paris; Américo Brajal, Villeneuve Le Roi, both of France

[73] Assignee: U.S. Philips Corporation, New York, N.Y.

[21] Appl. No.: 86,958

[22] Filed: Jul. 2, 1993

[30] Foreign Application Priority Data

Jul. 8, 1992 [FR] France .................. 92 08458

[51] Int. Cl.⁶ .................. H04J 9/00
[52] U.S. Cl. .................. 375/260; 375/267; 371/43; 370/11; 370/50
[58] Field of Search .................. 370/11, 19, 20, 21, 370/23, 50, 69.1, 70; 375/38, 40; 371/37.5, 37.7, 43

[56] References Cited

U.S. PATENT DOCUMENTS

| | | | |
|---|---|---|---|
| 4,881,241 | 11/1989 | Pommier et al. | 375/38 |
| 5,197,061 | 3/1993 | Halbert-Lassalle et al. | 370/11 |
| 5,228,025 | 7/1993 | Le Floch et al. | 370/20 |
| 5,243,629 | 9/1993 | Wei | 375/38 |
| 5,289,501 | 2/1994 | Seshadri et al. | 371/43 |

OTHER PUBLICATIONS

Lassalle et al., "Principles of Modulation and Channel Coding for Digital Broadcasting for Mobile Receivers", EBU Review —Technical, No. 224, Aug. 1987, pp. 168–190.

G. Ungerboeck, "Channel Coding with Multilevel/Phase Signals", IEEE Transaction on Information Theory, vol. IT-28, No. 1, Jan. 1982, pp. 55–67.

G. J. Pottie et al., "Multilevel Codes Based On Partitioning", IEEE Transactions on Information Theory, vol. 35, No. 1, Jan. 1989, pp. 87–98.

*Primary Examiner*—Stephen Chin
*Assistant Examiner*—Timothy J. May
*Attorney, Agent, or Firm*—Michael E. Marion

[57] ABSTRACT

Digital signal transmission system which operates by coded modulation of a constellation, the system comprising an encoder (5) which includes a modulator (13) installed at a transmitting station, and a decoder (105) which includes a demodulator (113) installed at a receiving station. A multistage channel encoder (12) carries out a concatenation of internal and external codes to blocks and divides the coding over various partitioning levels of the constellation. The coded symbol blocks are subjected to the work of a frequency-division interleaver (37), the modulator (13) operating according to an orthogonal carrier frequency-division multiplexing technique. The decoder (105) includes circuitry to carry out reverse operations to those carried out for the coding.

21 Claims, 6 Drawing Sheets

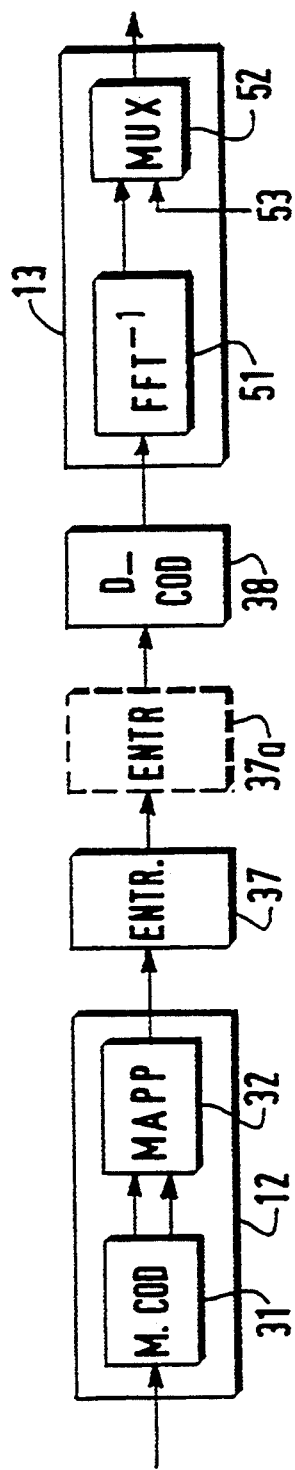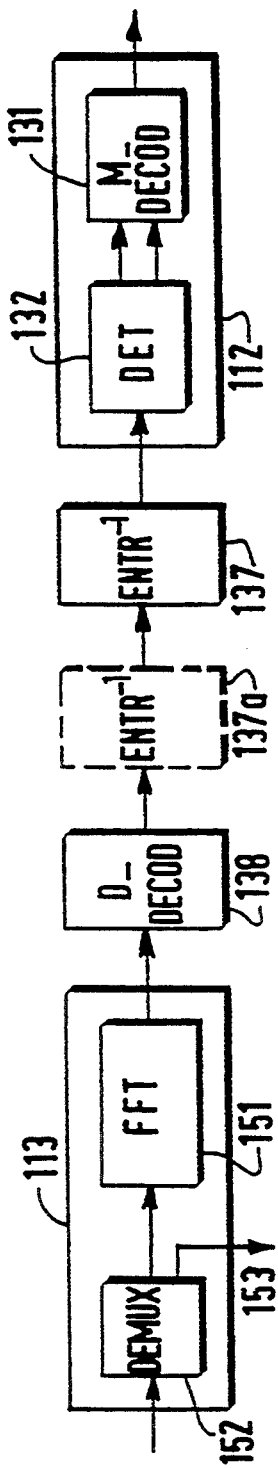
FIG. 5A
FIG. 5B

DIGITAL SIGNAL TRANSMISSION SYSTEM BASED ON PARTITIONING OF A CODED MODULATION WITH CONCATENATED CODINGS

BACKGROUND OF THE INVENTION

The invention relates to a digital signal transmission system which operates by coded modulation of a constellation, said system comprising an encoder which includes a modulator installed at a transmitting station, and a decoder which includes a demodulator installed at a receiving station, the encoder comprising a multistage channel encoder which combines a channel coding with the coded modulation, the channel encoder comprising an assigning element for assigning the signals of the stages to points of the constellation and for supplying symbols.

The invention also relates to an encoder and a decoder used in such a system.

The transmission system is mainly used for transmitting digital television signals (audio and/or video) to portable receivers, mobile receivers or others.

This may relate to transmitting digital television signals over a satellite channel or digital signals by way of hertzian waves. This may likewise relate to transmitting sound by mobile radio, or digital data to be stored, for example, on a compact disc, a digital video recorder. In these cases it is necessary first to effect a rate reduction at the source by a source encoder at the transmitting end and to restore the rate by a source decoder at the receiving end. In the cases where one wishes to transmit digital data between two digital processing units, for example, between two computers, this rate reduction by a source encoder is not necessary.

The most representative use is that relating to digital television for which the problems are the most extensive and the present patent application is filed for this use without this constituting any restriction whatsoever.

The digitization of television signals produces an overall gross rate for which a transmission cannot economically be realized over the existing transmission channels. Various coding techniques have been developed to reduce the rate (source coding). The performance of these coding algorithms is measured in terms of their "rate reduction factor" and of the picture quality recovered after decoding. The more the redundancy of the signal is reduced, the more the transmitted information is significant. Possible transmission errors, which may very easily be corrected if the transmitted information signals are redundant, have all the more serious consequences when the reduction factor increases.

Consequently, the transmission of digital television signals calls for a suitable protection. In order not to perceive the effects of transmission errors on a screen, the line error rate is to be less than $10^{-10}$.

The channel used for broadcasting by ground-based transmission is characterized by:

an overall bandwidth of 8 MHz, the effective bandwidth being of the order of 7 MHz, the presence of noise, considered additive white Gaussian noise, selective fading due to the multipath propagation of the transmitted signal.

The known source coding techniques, for example, based on an orthogonal transformation, can be utilized for diminishing the rate by a factor of more than 10 while a good recovered picture quality is ensured. This leads to transmission at a binary rate of the order of 8 Mbits/s. The transmission of digital television signals over such a channel makes a source coding as well as a digital modulation necessary with a spectral efficiency of the order of 1–2 bits/s/Hz.

Then it is necessary to perform a channel coding to protect the transmission against channel imperfections. The coding techniques and conventional modulation techniques have turned out to be restricted as regards fully satisfying the requirements of correct transmission (in these techniques, the coding function is considered an independent entity from the modulation function). However, the coding techniques have considerably improved thanks to the coding technique proposed by G. UNGERBOECK in the article entitled: "Channel Coding with Multilevel/Phase Signals", published in IEEE Transactions on Information Theory, Vol. IT-28, No. 1, January 1982, pages 55–67.

There is proposed to regard the channel coding and the modulation as one entity and, therefore, to combine a channel coding with a digital modulation. This makes it possible to increase the efficiency of digital transmission, thus to improve the performance without sacrificing the spectral efficiency. The redundancy added by the coding is transmitted by the increased size of the alphabet in lieu of diminishing the data rate. This technique is based on the principle of maximizing the minimum Euclidean distance between the transmitted coded point sequences.

Thus, after a coding which transforms p information bits into m bits, with $m > p$, where $m - p$ represents the added redundancy for the protection of information signals during transmission, with a $2^m$ state modulation, there are $2^{m-p}$ additional states available to transmit this redundancy. This modulation technique makes it possible to spread the redundancy over space and not over time.

At the end of the discovery by G. UNGERBOECK of the trellis coded modulations (TCM), block coded modulations (BCM) and trellis coded multi-dimensional modulations have been proposed.

Moderately complex TCMs (4 or 8 states) can provide a coding gain of 3 to 4 dB. But, in the mass production applications, an installed Viterbi decoder necessary for decoding these TCMs remains costly with current technology. An attractive coding technique for these applications is that of the multilevel coding. The importance of this technique is that it is adapted to a simple sub-optimum decoding method which is performed in stages and presents a good compromise between performance and complexity of installation.

Based on the partitioning principle of a constellation revealed by G. UNGERBOECK, the use of multilevel coding has particularly been analyzed by G. J. POTTIE and D. P. TAYLOR in "Multilevel Codes Based on Partitioning", IEEE Transactions on Information Theory, Vol. 35, No. 1, January 1989, pages 87–98. They describe a digital signal transmission system of the type defined in the opening paragraph of this description.

In their article these authors first analyze the principle of the multilevel coding which consists of partitioning a constellation and coding the points of the constellation and, secondly, define a multistage encoder, one coding stage being associated to one partitioning level, the points being transmitted in blocks through a transmission channel. This article considers the case of a single constellation.

At the receiving end a multistage decoder performs the reverse operations to those effected during the coding and recovers points that correspond to the transmitted points. In a conventional decoder, this causes decision operations to be performed during which operations points are estimated and bits are determined for the codes of the estimated points as a function of the phase and amplitude which are detected at the receiving end for each received point. Depending on the different conditions of transmission and reception, certain estimated bits are erroneous. A first multilevel decoder stage decides thereafter the first partitioning level. The result produced by this first stage is utilized for enabling the operation of the second stage and so forth up to the last stage.

For coding the redundancy, these authors use a channel encoder formed by an internal encoder followed by an external encoder. The internal encoder performs a convolutional coding which is concatenated with a parity coding performed by the external encoder. The codewords are then converted into coded points of a constellation and then transmitted by a modulator. The use of block codes is also mentioned.

Such a technique, however, is insufficient when the channel frequency response is subject to fading. It is also insufficient when the channel changes in the course of time. This is particularly the case when a mobile receiver is concerned, which may be subjected to very much varying and often very disturbed receiving conditions. It is thus not possible under these conditions to ensure a signal-to-noise ratio which is sufficient to guarantee correct reception without introducing a large complexity of hardware means.

It is thus an object of the invention, for a power level determined at the transmitting end, to ensure a correct reception while a small signal-to-noise ratio is tolerated. This is to be achieved while minimizing the costs and complexity of necessary hardware.

SUMMARY OF THE INVENTION

This object is achieved by means of a transmission system of the type described in the opening paragraph, in which said symbols are first interleaved in a frequency interleaver, then modulated in the modulator which operates according to an orthogonal carrier frequency-division multiplexing technique and the decoder comprises a demodulator for signals modulated according to the orthogonal carrier frequency-division multiplexing technique and a frequency de-interleaver.

The signals transmitted according to an orthogonal frequency-division multiplexing technique will in the following be denoted by the simplified name of OFDM (Orthogonal Frequency-Division Multiplex) signals.

The system is thus very robust with respect to the fading of the received signal when the transmission channel is modified. This advantage is obtained in that there is much protection of transmitted signals owing to the combination of internal and external concatenated codings and the multilevel partitioning, all this being combined in the OFDM transmission technique. This is obtained without increasing the complexity of hardware used, thus without increasing the costs. The decoding in stages of a multilevel system with concatenated codes combined with the OFDM technique presents better performance/complexity ratios than the other types of codings (block coding or convolutional coding), which use the transmission technique conventional for monocarriers when there is a variable fading channel.

When there is a multipath channel which is subject to fading, signals coming from the channel encoder undergo an interleaving in a frequency interleaver. If the channel varies with time, a time-division interleaver can be added to the frequency-division interleaver.

Preferably, the internal and external codings are determined for each codeword of the internal encoder to constitute a symbol for the external encoder. In this manner the use of an interleaver at the transmitting end and a de-interleaver at the receiving end between the internal encoder and the external encoder is avoided.

The coded modulation may be a phase shift keying modulation (PSK), or a quadrature amplitude modulation (QAM). In the case of a PSK modulation, one preferably has a differential encoder between the channel encoder and the modulator. This offers the advantage to simplify the carrier recovery arrangement at the receiving end.

Such a system further presents the advantage of being highly flexible, because it has a large number of parameters (codes, number of levels, number of carriers . . . ) which make it possible to program the system for many applications. More particularly, it is possible to use various coded modulations of the same family or of different families, by multiplexing them either according to a time-division or a frequency-division technique. These possibilities can also be expressed in software.

In the case of digital television, for diminishing the problems due to adjacent channel interference and to make the filtering carried out at the receiving end simpler for selecting the OFDM channel, the bandwidth of the signal can be reduced to 7 MHz, which corresponds to a spectral efficiency of the order of 1-15 bits/s Hz. Such a rate is thus compatible with a 4-state phase shift keying modulation (4-PSK).

A particularly simple and efficient embodiment consists thus of coding this 4-PSK by using 2 coding levels for the multistage encoder.

At the receiving end the receiver performs the reverse operations to those performed by the transmitter. Therefore, the decoder comprises a demodulator for modulated signals in that the demodulator partitions in a multiplex mode orthogonal carrier frequency and comprises a symbol de-interleaver. In the case where the transmitter uses a PSK modulation and a differential encoder, the receiver comprises a differential decoder.

Preferably, at the transmitting end, the OFDM modulation is effected in digital form in the modulator while an inverse Fourier Transform is carried out. Contrary to the receiving end, the demodulator carries out a direct Fourier Transform.

These various aspects of the invention and others will become apparent and will be elucidated with reference to embodiments of the invention to be described hereinafter.

BRIEF DESCRIPTION OF THE DRAWING

The invention will be better understood with the aid of the following Figures given by way of a non-limiting examples, in which:

FIGS. 5A and 5B illustrate a diagram of an encoder and a decoder according to the invention, respectively.

DETAILED DESCRIPTION OF THE PREFERRED EMBODIMENTS

Figure 1A:
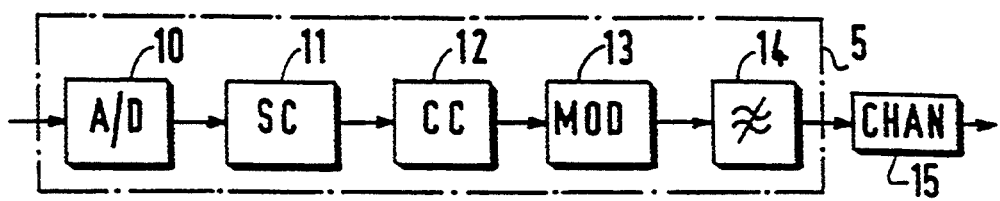
FIGS. 1-A and 1-B represent a block diagram of a digital signal encoder and a digital signal decoder.
Figure 1B:
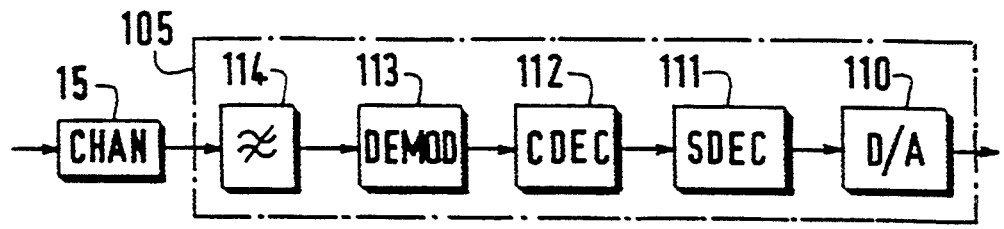

FIG. 1-A represents a block diagram of a digital signal encoder 5 as it appears in the transmitting section of a transmission network. It comprises in a series combination:

a source 10, for example, an analog/digital converter A/D, which produces digital signals to be coded when they are not yet available in digital form, a source encoder SC 11 (which may be omitted),
a channel encoder CC 12,
a modulator MOD 13,
a transmission filter 14.

The encoder is connected to a transmission channel 15. This may relate to Hertzian links, satellite links or cable links.

For an application to the transmission of digital television signals which have a better quality than those of the currently used analog television signals (PAL, SECAM standards etc.), the binary rate is to be of the order of 8 Mbits/s at the output of the source encoder 11. The samples are coded by the channel encoder 12 to make them invulnerable to channel imperfections. The modulator 13 then adapts the digital samples to the transmission channel, for example, a multipath channel with selective fading.

FIG. 1-B represents the block diagram of a decoder 105 which performs at the receiving end the reverse operations to those performed at the transmitting end. For this purpose it comprises (at the output of channel 15):

a receiving filter 114.
a demodulator DEMOD 113,
a channel decoder CDEC 112,
a source decoder SDEC 111 (which may be omitted),
a digital/analog converter D/A 110 when digital signals are used in analog form.

The encoder 5 and the decoder 105 constitute a coding/decoding system for coded modulation digital signals occurring in the transmission channel 15.

A—TRANSMISSION

1) Coding

The channel coding according to the invention is a multilevel coding. For clarity the multilevel coding principle will be explained first.

Let us consider (FIG. 2-A) a constellation $A_0$ having $2^m$ points capable of ensuring the transmission of m bits per point. If $M(M \leq m)$ designates the number of bits to be coded, the constellation $A_o$ is partitioned into M levels thus producing $2^M$ subsets. The principle of this partitioning is identical with the one defined by G. UNGERBOECK. This principle maximizes the minimum Euclidean distance in subsets of the partitioning. If one designates by $d_i$ a minimum Euclidean distance in the subsets obtained at the $i^{th}$ partitioning level, the following inequality is to be verified:

$$d_0 < d_1 < d_2 < \ldots < d_M$$

where $d_0$ is the minimum distance in $A_0$.

Figure 2A:
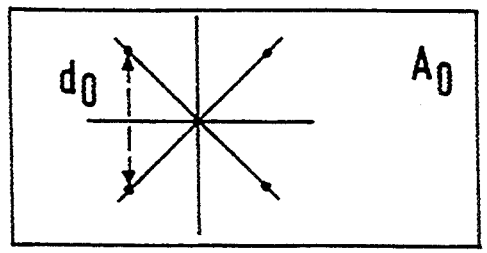
FIGS. 2-A, 2-B, 2-C give a representation of a constellation $A_0$ of a 4-PSK modulation and of its two partitioning levels.
Figure 2B:
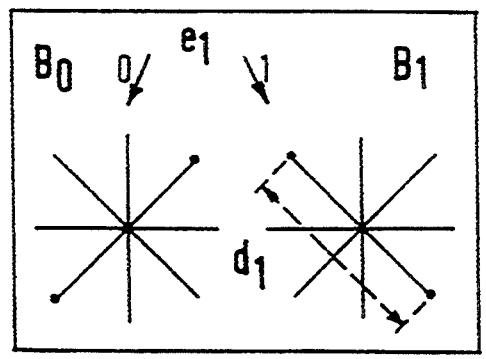
Figure 2C:
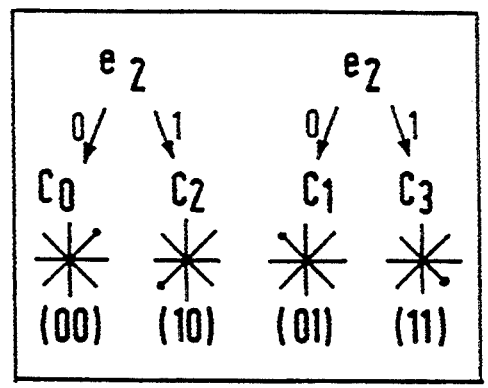

Then, the M bits $e_1, e_2, \ldots, e_i, e_M$, (with $e_i$ being the bit associated to the $i^{th}$ level of the partitioning), select one of the $2^M$ subsets and the m-M remaining bits designate a point in the selected subset. FIG. 2 gives, by way of example, the partitioning diagram for a 4-PSK modulation. The constellation $A_0$ (FIG. 2A) is first partitioned (FIG. 2B) into two subsets $B_0$ and $B_1$, having a minimum distance $d_1$, with $e_i = e_1 = o/1$ ($e_1 = 0$ for $B_0$ and $e_1 = 1$ for $B_1$), after which comes (FIG. 2C) having four subsets $C_i$, $i\epsilon\{0, 1, 2, 3\}$ with $e_i = e_2 = o/1$ ($e_2 = 0$ for $C_0$ and $C_1$ and $e_2 = 1$ for $C_2$ or $C_3$). A subset is then constituted by one point. We have $d_0 < d_1$.

Figure 3:
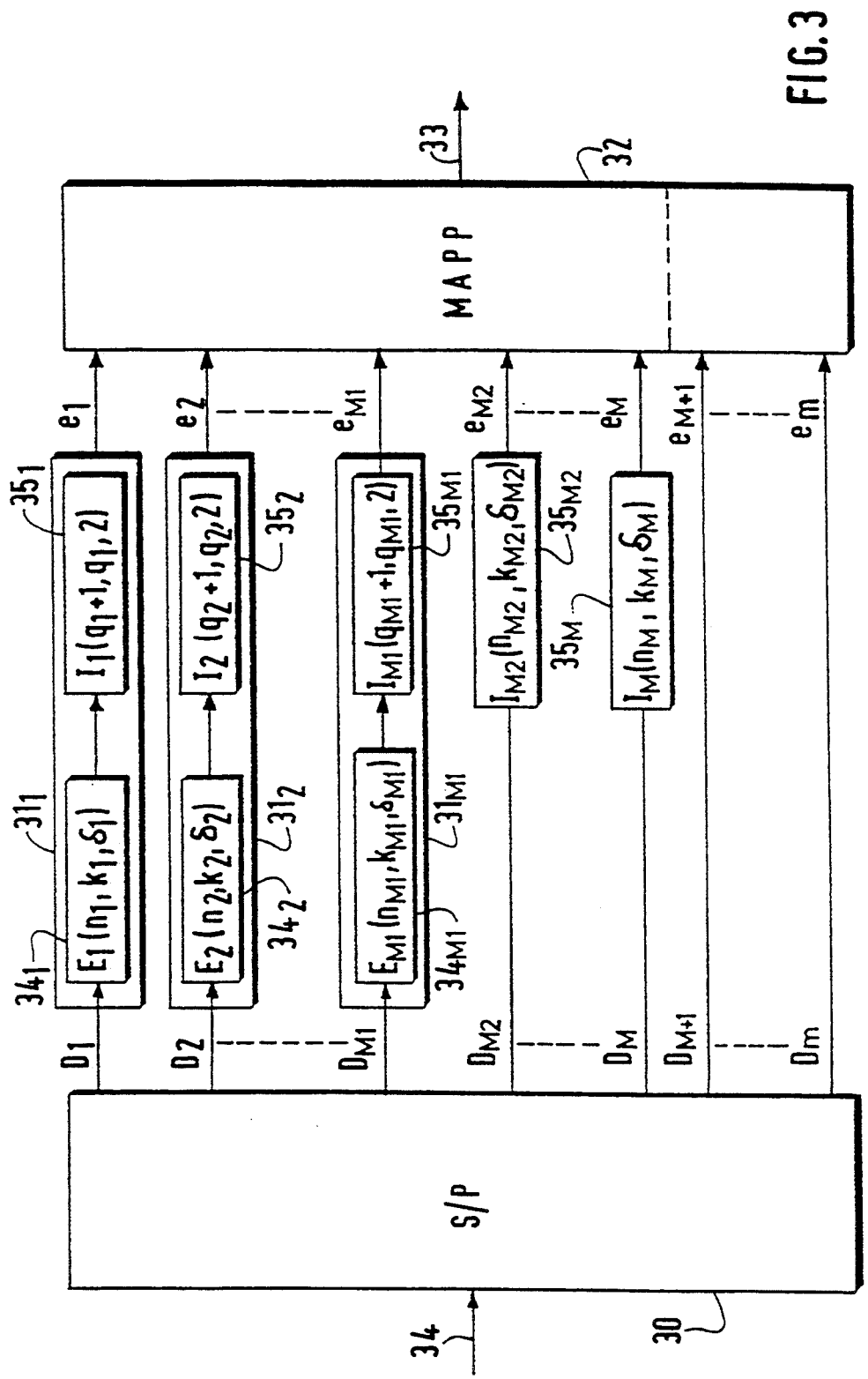
FIG. 3 shows a diagram of a multistage encoder for concatenated codes.

This method of associating points of the constellation has for its aim to classify the m bits represented by the transmitted point as a function of their vulnerability to noise. In accordance with the partitioning principle described hereinbefore, one may show for the general case that if the bits $e_k$, $k \leq i-1$, are sufficiently protected so that they are correct, the bit $e_i$, $i \leq M$, is better protected against noise than all the other bits $e_j$, $j < i$, and the (m-M) last bits are the least vulnerable. This denotes that it is more suitable to code the bits separately with different codes and not to proceed with a conventional serial coding according to which all the bits are protected against channel noise in the same manner. It is the multilevel coding principle that, after partitioning the constellation $A_0$ into M levels, consists of using M encoders $E_i$, $i = 1, \ldots, M$, to protect these M bits with various protection levels. The diagram of this encoder is represented in FIG. 3. The data stream to be transmitted (line 34), having rate D, is divided into m data streams $D_i$, $i = 1, \ldots, m$, in the S/P element 30. The M first streams are coded with M codes, the following data streams $D_{M+1}$ to $D_m$ cannot be encoded.

From the M coded data streams the first streams, from $D_1$ to $D_{M1}$ are coded with concatenated codes ($E_i$, $I_i$), while $E_i$ is a block code and $I_i$ is a parity code. The next data streams, after $D_{M1}$ and up to $D_M$, are coded with a unique binary code $I_i$ ($n_i$, $k_i$, $\delta_i$).

The codes $E_i(n_i, k_i, \delta_i)$ $i = 1, \ldots M_1$, have an efficiency $R_i = k_i/n_i$, where $n_i$ represents the number of symbols transmitted per block, $k_i$ represents the number of information symbols transmitted per block, and $\delta_i$ represents the minimum Hamming distance. External encoders $34_1, 34_2, \ldots 34_{M1}$ perform the codings $E_i$. A code symbol $E_i$ is represented in $q_i$ bits.

The parity codes $I_i$ ($q_{i+1}$, $q_i$, 2) code each symbol of $q_i$ bits produced by the external encoders, by adding thereto a parity bit. Internal encoders $35_1, 35_2, \ldots 35_{M1}$ carry out the codings $I_i$.

The coding of each symbol of the external code with an internal parity code constitutes the concatenated coding $31_i$ of the two codes $E_i$ and $I_i$. In this manner the use of an interleaver at the transmitting end and a deinterleaver at the receiving end between the internal encoder and the external encoder is avoided.

The $M_1$ bits are coded with a concatenated coding as a result of which they have equivalent minimum distances knowing that $d_i$ represents the distances caused by the partitioning, with:

$$d_0 < d_1 < d_2 \ldots < d_{M_1} \ldots < d_M), (dis_1)^2_i = 2d^2_{i-1} \delta_i,$$
$$i = 1, \ldots M_1.$$

In the same way the equivalent minimum distances of the bits coded with a minimum distance unique code $\delta_i (i > M_1)$ are:

$$(dis_2)^2_i = \delta_i d^2_{i-1}, i = M_1 + 1, \ldots M,$$

and those which are not coded:

$$(dis_3)^2_i = d^2_M = \text{constant } i = M+1, \ldots m.$$

The system is optimal if:
$(dis_1)_i = (dis_2)_i = (dis_3)_i$.

The codes $E_1, \ldots E_{M_1}$ may be Reed-Solomon codes on a Galois field GC $(2^{q_1})$. That is to say, that each symbol of the RS code is formed by $q_i$ bits.

The codes $I_1, \ldots I_{M_1}$ may be binary parity codes $(q_1+1, q_1 2)$.

If it is supposed that all the codes $E_i$ have the same length, with $n_i = n$ and $q_i = q$, and that the M codes $E_i$ are block codes, this coding may be described by a software structure which is identical with that used for the BCMs. One codeword corresponds to n (q+1) points of the constellation and may be represented by a binary matrix G having m rows and n (q+1) columns, where the $j^{th}$ column represents the binary assignment of the $j^{th}$ point of the block (the point being that of the constellation) and the $i^{th}$ row represents the bits assigned to the $i^{th}$ partitioning level. The row i, i= 1, ... , $M_1$, is a concatenated codeword and the (m-M) last rows contain either uncoded bits or bits coded with a unique internal code.

With, for example, two partitioning levels in the case of a 4-PSK modulation, we have:

$$G = \begin{vmatrix} e_1^1 \; e_1^2 \ldots e_1^i \; e_1^{i+1} \ldots e_1^{n(q+1)} \\ e_2^1 \; e_2^2 \ldots e_2^i \; e_2^{i+1} \ldots e_2^{n(q+1)} \end{vmatrix}$$

The bits of a column, for example $e_1^1, e_2^1$ form a point $r^1$.

The multilevel coding (FIG. 3) is effected by means of a serial/parallel conversion circuit 30 which transforms the serial data having rate D into parallel data having rate $D_1, D_2 \ldots D_m$. The $M_1$ first binary streams are coded by encoders $31_1, 31_2, \ldots 31_{M_1}$ which produce the coded binary data $e_1, e_2 \ldots e_{M_1}$ resulting from a concatenated coding by the encoders $34_1$ to $34_{M_1}$ and $35_1$ to $35_{M_1}$. The binary streams from $M_2$ to M are coded by the encoders $35_{M_2} \ldots 35_M$ which produce binary data $e_{M_2} \ldots e_M$ coming from the unique coding $I_i$. Binary streams $D_{M+1} \ldots D_m$ may be uncoded. A selection element MAPP 32 makes it possible to ensure for each word ($e_1, e_2 \ldots e_m$) the binary assignment of a point of the constellation containing $2^m$ points which is then transmitted by the modulator 13 which operates according to the OFDM technique (line 33 ).

According to the invention, preferably a 4-PSK modulation is used for processing 8 Mbits/sec rates. In this case the channel coding diagram utilizes only the two first stages $31_1, 31_2$ of FIG. 3

By way of example, in the case of a 4-PSK, with m=M=2, the coding of the first level (first stage) may be a concatenated coding, formed by:

a code $E_1$=RS (40, 30, 11) over a Galois field of 256 elements. $q_1$=8 is the number of bits of a symbol and a code $I_1$=Parity (9, 8, 2).

The code RS (40, 30, 11) has a length of 40 and a size of 30, i.e. 30 information symbols per block. Its correction capacity is 5 and its minimum distance is 11. It is concatenated with the parity code (9, 8, 2) which has a length of 9 bits, a size of 8 and a minimum distance of 2. The blocks of 8 bits at the input of the internal encoder constitute the symbols of the external code RS.

The coding of the second level (second stage) is performed with a code $E_2$=RS (120, 110, 11) and with a parity code:

$I_2$=Parity (9, 8, 2).

Figure 4:
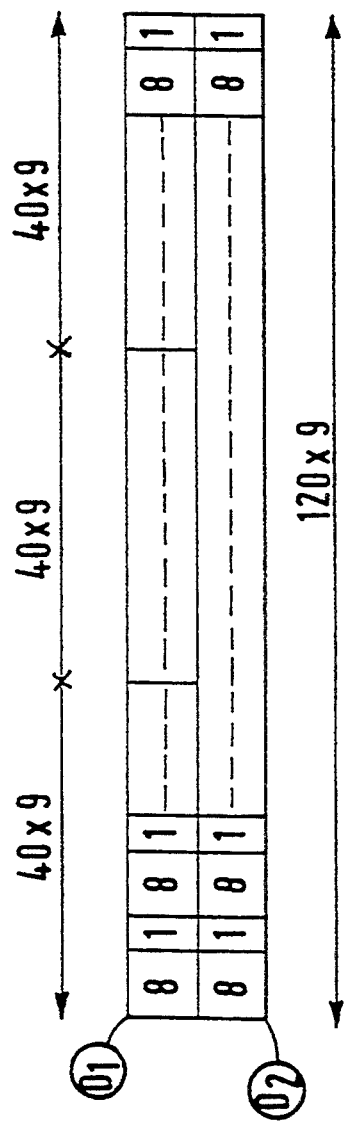
FIG. 4 shows a coding matrix of a 4-PSK modulation with two coding levels.

The matrix is then represented in the form shown in FIG. 4. Three level 1 codewords correspond to one level 2 codeword. One point of the 4-PSK is represented by a column of this matrix. One block is formed by 1080 consecutive points which is equivalent to 2160 transmitted bits.

Preferably, 2 encoders RS are used which have the same correction capacity, but have two different lengths to simplify the decoder. In effect, a single decoder RS is used at the receiving end and has a sequential decoding: the level 1 is decoded (the sequence of bits $e_1$ is estimated) before level 2 is decoded (the bits $e_2$ are estimated).

The fact that a shorter code RS is used for the first level implies a greater protection for level 1 than for level 2. The selected length for the second level (120) is a multiple of the codelength of the first level (40), so that the synchronization of the decoder is simplified.

A codeword is generated in the following fashion:

1600 information bits are distributed over 2 levels at the input of the encoder: (S/P conversion 30, FIG. 3).

Level 1

720 bits distributed over the first level D1, or 90 bytes which are coded by the encoder RS (40, 30, 11).

Thus, the encoder $34_1$ (FIG. 3) generates 40 bytes for every 30 bytes at the input. There are 3 blocks of 40 bytes each, that is to say, 120 bytes at the output of the encoder.

Each byte (8bits) is coded with the parity code $35_1$ (FIG. 3) which adds one parity bit thereto, thus $3 \times 40 \times 9 = 120 \times 9$ bits are obtained at the output of the encoder of the first level (FIG. 4).

Level 2

880 bits distributed over the second level D2 or 110 information bytes which are coded by the encoder $34_2$ (FIG. 3) RS (120, 110, 11). This encoder generates a block of 120 bytes. At the output of the parity encoder $35_2$ (FIG. 3) there are thus $120 \times 9$ bits (like for the first level). The $120 \times 9$ bits of the first level D1 and the $120 \times 9$ bits of the second level D2 determine the sequence of $120 \times 9 = 1080$ symbols transmitted on the basis of the 4-PSK constellation. The overall rate of the code $R = 1600/(2 \times 9 \times 120) = 0.74$, thus the spectral efficiency is $S_{eff} = 2 \times R = 1.48$ bits/s/Hz.

The general principle described in FIG. 3 is also applied to other coded modulations, for example, a QAM modulation.

2) Interleaving—Differential Coding

Because the codewords produced by the channel encoder are transmitted over a channel which may be selective in the frequency-division domain and possibly also in the time-division domain (mobile receivers), it is recommended to make them undergo an interleaving to uncorrelate the received symbols which constitute a block that corresponds to a codeword. The diagram of FIG. 5-A represents the multilevel encoder M-COD 31 followed by a binary assigning element MAPP 32. The codewords are fed to an interleaver 37. When the channel is selective in the time-division domain, an interleaving is performed in a time-division interleaver 37a. This diagram preferably relates to a PSK modulation. To facilitate the recovery of carriers on reception, the interleaver 37 is preferably followed by a differential phase encoder D-COD 38. The modulation used is thus a differential 4-PSK modulation (that is to say, a DQPSK), the differential coding being performed independently for each useful carrier before the OFDM symbol is generated.

The phase of a symbol $x_j$ is coded different from the phase of a preceding symbol $x_{j-1}$, so that:

$$x_j = (1/\sqrt{2}) \, x_{j-1} \times C_j$$

where $C_j$ is the symbol belonging to the 4-PSK constellation generated by the channel encoder,
where $C_j \in \{1+i, 1-i, -1+i, -1-i\}$ and
where i defines the imaginary representation.

3) OFDM Modulation

The transmitted complex symbols $x_k$ of the differential encoder are transmitted with the aid of an OFDM-modulator according to an orthogonal carrier frequency-division multiplexing technique.

The OFDM technique consists of frequency-division multiplexing a plurality of orthogonal carriers modulated by the symbols. An OFDM symbol can be written as:

$$s(t) = R_e \left\{ e^{2i\pi f_0 t} \sum_{k=0}^{N-1} x_k \cdot \phi_k(t) \right\} \quad (1)$$

for $$j \cdot T'_s < t < (j+1) T'_s$$

with $\phi_k(t) = e^{2i\pi k t/T_s}$ for $jT_s \leq k \leq (j+1)T_s$ where:
$T'_s$: total duration of an OFDM symbol, $T'_s = T_s + \Delta$.
$R_e$: real part of a complex number.
k: index of orthogonal carriers.
$T_s$: useful duration of an OFDM symbol.
$\Delta$: guard interval.
N: maximum number of carriers.
$f_0$: random frequency.
j: index of the OFDM symbol.

Thus, between the instants $j.T'_s$ and $(j+1) T'_s$, an OFDM signal is constituted by a block of complex symbols $x_k$, each $x_k$ modulating one orthogonal carrier $0 \leq k \leq N-1$.

To avoid the problem of spectrum overlapping and to facilitate the filtering on reception, the sum corresponding to the equation (1) is made of $N_u$ carriers where $N_u$ is the number of useful carriers ($N_u < N$).

To perform the OFDM modulation, that is to say, form the signal s(t) of equation (1), the modulator 13 comprises a calculation arrangement 51 for carrying out an inverse Fast Fourier Transform ($FFT^{-1}$). Thereto, a number of the form $2^x$, where x is an integer, is chosen for N. The arrangement 51 is followed by a multiplexer 52 which also has an input 53 intended to receive other control blocks intended for transmission.

The selected parameters are, for example, the following:

$T'_s = 160$ μs, $T_s = 128$ μs and $\Delta = 32$ μs, $N = 1024$ carriers, $N_u = 900$ carriers.

The guard interval $\Delta$ has for its main object to absorb the echoes coming from multipath channels and having delays shorter than $\Delta$. During the guard interval (which is preferably equal to a quarter of the useful duration), a signal equal to part of the useful duration is transmitted. Consequently, this causes a loss of spectral efficiency with a ratio equal to $$\frac{T_s}{T'_s} = \frac{T_s}{T_s + \Delta}$$

(4/5) in our case.

The choice of $N_u = 900$ is caused by the fact that the band around each carrier is $1/T_s = 7.81$ KHz and 900 carriers are necessary to have an effective bandwidth of the transmitted signal of about 7 MHz (the exact bandwidth being 7.031 MHz).

The output symbols of the channel encoder are transmitted in frames. Thus a frame brings together a variety of time-division multiplexed OFDM symbols. An OFDM symbol may contain data or may be a particular symbol used for synchronization (of frame, timing, carrier) or used as a reference symbol for the differential modulation.

An example of the frame structure is given by:

TABLE I

| 1 Nul | 2 AFC | 3 Wob | 4 EXT 1 | 5 EXT 2 | 6 DATA 1 | 7 DATA 2 | | j−1 | j | | 125 DATA 120 |
|---|---|---|---|---|---|---|---|---|---|---|---|
| $T_s = 160$ μs | | | | | | | | k | k | | |
| $T_f = 20$ ms | | | | | | | | | | | |

The frame contains 125 OFDM symbols and has a duration $T_f$ of 20 ms:

The first symbol is the zero symbol during which nothing is transmitted ($x_k = 0$, k=0, N−1). It is used for synchronizing the beginning of the frame.

The second symbol is the AFC symbol (automatic frequency control) used for synchronizing the frequency of the local oscillator of the receiver with that of the transmitter.

The third symbol is the wobbling symbol defined by:

$$x_k = \sqrt{2}\, e^{j\phi k}, \phi_k = \pi \frac{k^2}{N} + \pi/4$$

The wobbling symbol is used as a reference symbol for the differential coding and also for estimating the impulse response of the channel to restore synchronization of the timing.

The fourth and fifth symbols are additional symbols which may be used for transmitting service data.

Finally, there are the 120 OFDM data symbols.

One frame contains 100 codewords generated by the channel encoder.

The use of a guard interval reduces the spectral efficiency by a factor of 4/5 and the insertion per frame of 5 check blocks every 125 blocks makes this efficiency diminish by 120/125. The overall spectral efficiency of the system is thus: $S_{eff} = 1.48 \times 4/5 \times 120/125 = 1.136$ bits/s/Hz.

For generating an OFDM frame, the following operations are performed:

The channel encoder 12 generates 100 codewords of 1080 symbols each having the 4-PSK modulation, which corresponds to the transmission of 160 Kbits of information signals/frame or 8 Mbits of information signals/second.

The $100 \times 1080 = 108$ k symbols having the 4-PSK modulation are grouped in blocks of 900 symbols, which corresponds to 120 blocks of 900 QPSK symbols. Each block of 900 symbols corresponds to one OFDM symbol with 900 useful carriers. The frequency-division interleaving (block 37) consists of permuting in the frequency-division domain once per 900 QPSK symbols which constitute one OFDM symbol. This is performed in accordance with:

$$P(i) = \mathrm{mod}(100 + P(i-1), 900) + 1,$$

where $P(1) = 1$, $2 \leq i \leq 900$ and $P(i)$ is the position of the $i^{th}$ symbol of the block after interleaving. The rood function is the modulo function. The object is to reduce the correlation of the received symbols by de-interleaving them on reception which makes it possible to have an optimum use of the multistage decoder. If the channel is time-selective, a time-division interleaver 37a is to be inserted. The two frequency-division and time-division interleavers may constitute a single frequency-cum-time-division interleaving unit.

Then the differential coding (coder 38) is performed independently, carrier by carrier, by taking the phase of the corresponding carrier of the wobbling symbol as a reference. The differential coding is performed between consecutive blocks j−1 and j for a symbol of the same rank k in the blocks (TABLE I).

For generating the OFDM signal of the frame, a FFT$^{-1}$ (block 51) 1024 in size, is performed 120 times (once per block of 900 symbols). To have 1024 symbols, 62 zeros are added on either one of the two sides of each block of 900 symbols (samples of 0) before the inverse Fast Fourier Transform is carried out.

Finally, the 120 OFDM data symbols at the end of the FFT$^{-1}$ are time-division multiplexed with the 5 OFDM check symbols (line 53) to generate the frame of 125 OFDM symbols.

The choice of the parameters relating to the channel encoder (code lengths RS on the first and second levels, the capacity of code correction), and relating to the OFDM modulator (number $N_u$ of useful carriers and the number $N_s$ of OFDM symbols per frame) results from the fact that a frame is to contain an integer number of codewords (so that the frame synchronization can be used for detecting the beginning of the received block and which corresponds to a transmitted codeword) and have approximately a bandwidth of 7 MHz. The solution obtained is:

$N_u = 900$ carriers and $N_s = 125$ of which 120 OFDM symbols are useful symbols $N_1 = 40 = $ length of the code RS (first level)

$N_2 = 120 = $ length of the code RS (second level).

B—RECEPTION

At the receiving end, the receiver performs the reverse operations to those performed at the transmitting end. FIG. 5-B represents a diagram of such a receiver. It comprises a demodulator 113 which includes a demultiplexer 152 and a calculation arrangement 151 for a direct Fast Fourier Transform (FFT). The demultiplexer 152 supplies check data 153 which are used for synchronizing the receiver. The demodulator 113 is followed by a differential decoder 138. A de-interleaver 137 and a channel decoder 112. The latter comprises a detector 132 followed by the multistage decoder 131. If an interleaving has taken place in the time-division domain at the transmitting end, also a time-division de-interleaver 137a will be used.

1) Demodulation

During a frame period (20 ms), the time-division demultiplexer 152 supplies 120 data blocks (from the 125 forming a frame). The frequency of the received signal is sampled, $f_e = N/T_s = 8$ MHz, while per block only the 1024 samples are taken into consideration that have a useful duration of $T_s = 128$ μs (one does not take the 256 samples of the block into consideration during the guard interval).

Then a FFT is carried out for each block of 1024 samples. Thus 120 FFTs are carried out per frame. This makes it possible to demodulate an OFDM signal.

For each block of 1024 symbols at the end of the FFT, 900 symbols corresponding to the useful carriers are saved.

2) Differential Decoding—De-interleaving

A differential decoding is then independently applied to each carrier. The differential decoder 138 uses 2 symbols of the same rank k which belong to 2 consecutive blocks j−1 and j to estimate the transmitted QPSK symbol, the reference symbol being the phase of the corresponding carrier of the wobbling symbol (known from the demodulator).

The differential decoder produces per frame 120 blocks of 900 symbols or 100 blocks of 1080 symbols.

The frequency-division de-interleaver 137 then de-interleaves symbols which are thereafter decoded by the channel decoder 112. After the frequency-division de-interleaving, the channel decoder decodes in blocks of 1080 symbols because one codeword corresponds to 1080 symbols.

3—Decoding

The decoding consists of carrying out the reverse coding operations. For each stage a detection is made in each of the partitioning levels. A concatenated decoding is carried out in the stages where a concatenated coding has been performed. After each detection in a subset of the partitioning, each stage performs two decodings (internal and external decodings).

Figure 6:
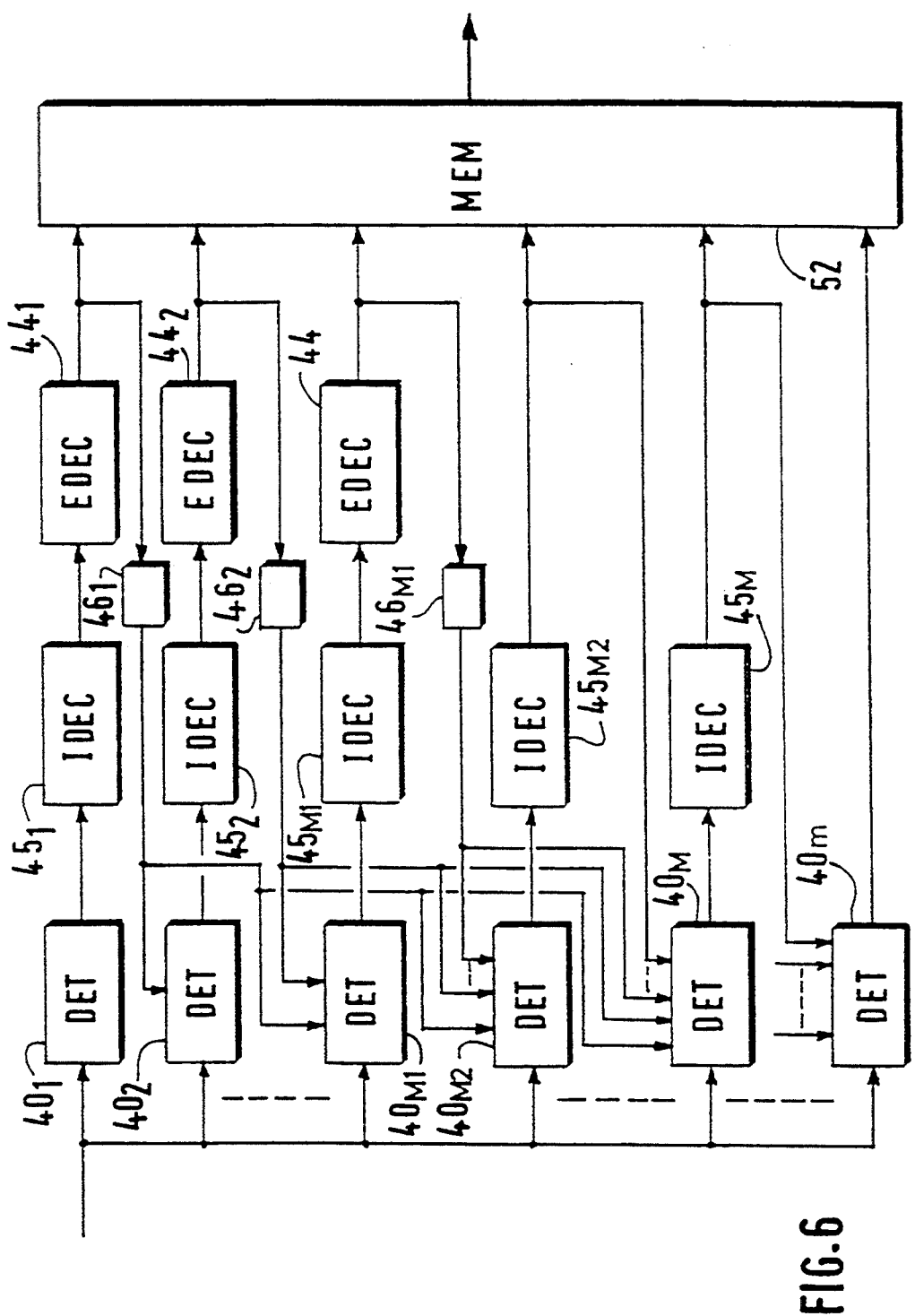
FIG. 6 shows a diagram of a multistage decoder for concatenated codes.

FIG. 6 represents a general diagram of a multistage decoder with specific stages operating with concatenated codes. Detectors $40_1, \ldots 40_{M1}, 40_{M2} \ldots 40_M \ldots 40_m$ each carry out detections on their own partitioning level. For the stages $i=1$ to $M_1$, decoders I-DEC $45_1$, $45_2 \ldots 45_{M1}$ carry out maximum likelihood internal decodings. They supply deleted and non-deleted internal codewords to external decoders E-DEC $44_1, 44_2, \ldots 44_{M1}$. Said internal decoders suppress the redundancy due to the internal coding of each point. The external decoders then give estimations of the bit sequences.

To estimate a level i, estimations are taken into consideration which have been made on the preceding levels. Therefore, the information signals estimated by the level i-1 are recoded by encoders $46_1, 46_2 \ldots 46_{M1}$ to find back the redundancy of the internal codewords. This is necessary to have $n(q+1)$-bit-long codewords which are necessary for the next stages.

For the stages where there is only a single type of internal coding ($i=M_2$ to M), only one detection and one maximum likelihood decoding are performed.

For the stages where there is no coding ($i=M+1$ to m), only a detection is made. The output date enter a memory 52.

Figure 7:
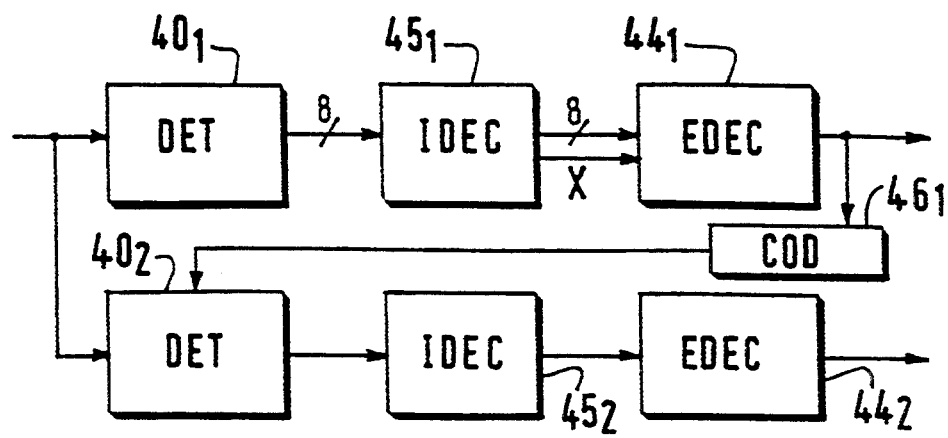
FIG. 7 shows a diagram of a two-stage decoder according to the invention.

By way of example, FIG. 7 represents a multistage decoding for decoding concatenated codes while use is made of a 4-PSK modulation. The decoding is performed of one of the received blocks of 1080 symbols.

With respect to FIG. 7:

the first stage comprises a detector $40_1$, an internal decoder $45_1$, an external decoder $44_1$ and an encoder $46_1$, the second stage comprises a detector $40_2$, an internal decoder $45_2$ and an external decoder $44_2$.

The first stage decodes an external code RS (40, 30, 11) concatenated with an internal parity code (9, 8, 2).

The second stage decodes an external code (120, 110, 11) concatenated with an internal parity code (9, 8, 2).

A transmitted block S contains 1080 points of the constellation $S=(s_1 \ldots s_{1080})$.

A received block R also contains 1080 received points: $R=(r_1 \ldots r_{1080})$.

Two decoding mechanisms can be provided according to which the internal decoders cause deletions to occur or not.

If a deletion occurs, the external decoder RS fills in the deletions and corrects the errors. A deletion is made when the codeword estimated by the internal decoder is not reliable enough. This necessitates a decoding of a two-state trellis for the example under consideration.

If no deletion occurs, the external decoder RS corrects only errors.

Figure 8A:
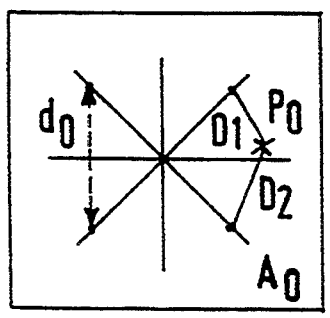
FIGS. 8A, 8-B give a representation of a 4-PSK constellation with received points, and FIG. 9 gives a representation of a trellis of an internal code.
Figure 8B:
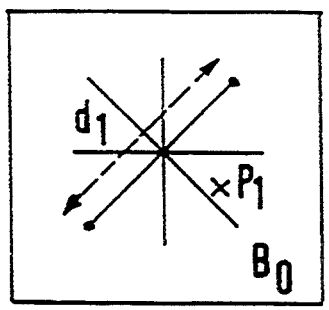

To determine whether an estimated bit is reliable or not, the internal decoder detects the received point ($P_0$ in $A_0$ for the first stage or, for example, $P_1$ in $B_0$ for the second stage, FIGS. 8-A end 8-B), and places it in the 4-PSK constellation. The first stage determines the least significant bit and the second stage determines the most significant bit.

a) If deletion takes place, for estimating the estimated bit for the point $P_o$, the detector $40_1$ computes two distances D1 and D2 relative to two points of the 4-PSK constellation which are nearest to the received point $P_0$. Such a detection is made for a sequence of received points, in this case 9 points, while the external decoder used is taken into consideration. The detector $40_1$ thus supplies sequences of 9 estimated bit pairs as well as the corresponding distances $D_1$ and $D_2$. For each sequence of 9 bit pairs, corresponding to 9 received points, the Viterbi decoder $45_1$ uses these data and determines the quality which is certain or ambiguous for each internal codeword. The Viterbi decoding is a maximum likelihood decoding which uses the code trellis used by the encoder.

Figure 9:
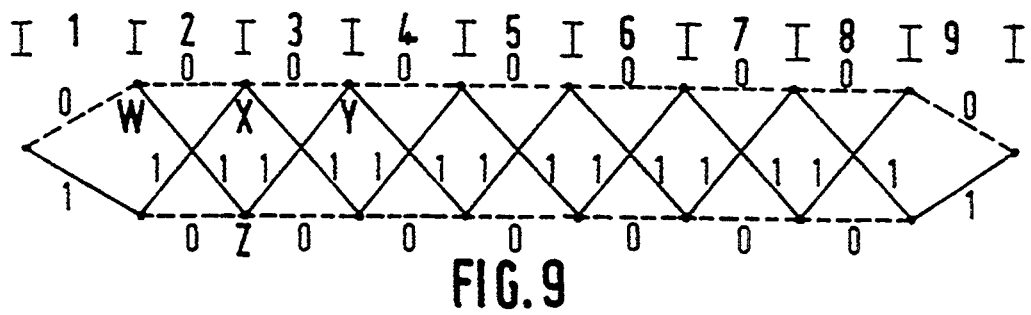

The internal code trellis is represented in FIG. 9 for a sequence of 9 received points. The black points of FIG. 9 represent the trellis nodes. The dashed lines correspond to the 0 bits and the solid lines correspond to 1 bits. A path ending at node Ni of the trellis thus represents the state of the decisions made on the previous i−1 points of the modulation.

The maximum likelihood decoding consists of determining, for example, for a node Y, possible paths in the trellis while the already decoded preceding points are taken into account. Thus, for the node Y (FIG. 9) there may exist the paths W X Y or W Z Y. A metric is computed which corresponds to the sum of the distances $D_1$, $D_2$ determined for each preceding point and the path which has the smallest metric is selected to be the maximum likelihood path. At node Y the decoder thus assigns to the bit of the received point either the 0 or 1 bit corresponding to the selected path. This computation is made in the same manner at each node of the trellis of a sequence.

But there may appear situations in which the sums computed for two different paths lie very close together: there is thus ambiguity. In this case an estimation is not made if the difference between the two sums is smaller than a small predetermined difference. The sequence is thus put in the "delete state". This is called "deleted". This comparison of matrices is only made for one sequence at a time and is expressed by the deletion of one sequence at a time, a sequence corresponding to a symbol of the external code.

When a sequence is deleted, an ambiguity is created for all the bits of the sequence and a flag X is positioned (FIG. 7). This ambiguity is then eliminated by the external decoder $44_1$.

The Viterbi decoder $45_1$ thus supplies 9-bit-long sequences, of which 8 bits represent the coded information, and deleted sequences. An external codeword corresponds to 40 sequences of 8 bits, that is, 320 bits. The external decoder, which may be a Reed-Solomon decoder, operates with $8 \times 40$ bits, that is to say, 320 bits and produces the estimated bits via the first stage, that is, 40 sequences of 8 information bits.

Second stage

The second stage needs bits from the first stage to operate. The parity bits have been extracted by the first stage. It is thus necessary to re-insert them into the 40 sequences before feeding the 40 sequences to the second stage. A parity coding I (9, 8, 2) performed by the encoder $46_1$ makes it possible to do so.

The thus reconstructed $40 \times 9$-bit-sequences make it possible for the second detector $40_2$ to determine the partitioning level $B_0$ or $B_1$ to be taken into consideration for the detection. The Viterbi decoder $45_2$ then performs a decoding over 9 bits corresponding to 9 received bits according to the example selected for the coding. The external decoder, which may be a Reed-Solomon decoder, operates with $8 \times 120$ bits, that is to say, 960 bits and produces the estimated bits via the second stage, that is 120, sequences of 8 information bits.

b) In the case where nothing is deleted, in the first stage, a threshold decision is made about the 9 received symbols ($r_1, \ldots r_2 \ldots r_9$) in the constellation (nearest point) to determine the 9 bits which correspond to the first level (for each received symbol this is a LSB bit of the nearest symbol to the received symbol.

Two cases present themselves:

first case: If the 9 bits verify the parity, these 9 bits constitute the optimum decision.

second case: If the parity is not verified, it is enough to change 1 bit: the least reliable bit. This least reliable bit is the one which corresponds to the received symbol which is nearest to the decision threshold in the constellation (that is to say, nearest to the axes I and Q).

For the second stage, this is the same principle, with the exception that the threshold decision is made not in $A_0$ but in $B_0$ or $B_1$ depending on the corresponding bit of the first level, that is to say, that for $r_i$ one detects in $B_0$ whether the bit $e_1 = 0$ and in $B_1$ whether $e_1 = 1$, to estimate the bit $e_2$. If the 9 bits $e_2$ of the 9 received symbols verify parity, the result is correct. If not, the least significant bit is changed, that is to say, the bit which corresponds to the received symbol nearest to the threshold in $B_0$ or $B_1$ (the thresholds in this case are the diagonals and not the axes I and Q).

An OFDM frame thus comprises a sequence of data blocks. It is possible to combine the transmission of blocks having various coded modulations, one block being coded according to a certain coded modulation technique and another block being coded according to another coded modulation technique. It is then possible to combine PSK and/or QAM modulation methods.

We claim:

1. Digital signal transmission system which operates by coded modulation of a constellation, the system comprising a transmitting station including an encoder (5) which includes a modulator (13) installed in the transmitting station, a receiving station comprising a decoder (105) which includes a demodulator (113) installed in the receiving station, and a channel (15), the encoder (5) and the decoder (105) communicating together through the channel (15);

the encoder (5) comprising a plurality (12) of multi-stage channel sub-encoders (31); each multi-stage channel subencoder (31) combining a channel coding, for protecting data bits to transmit, with the coded modulation, the whole channel coding being subdivided and assigned to several successive partitioning levels of the constellation, each multi-stage channel sub-encoder (31) further comprising an assigning element (32) for assigning the encoded signals to one partitioning level and for supplying symbols which modulate a carrier, each multi-stage channel sub-encoder (31) having its own carrier with a unique carrier frequency;

a frequency interleaver (37) for interleaving together said symbols from all the sub-encoders (31) to form a modulating signal;

a modulator (13) for receiving the carriers and modulating signal and for modulating the carriers in the modulator (13), the carrier modulation being performed according to an orthogonal carrier frequency-division multiplexing technique for obtaining modulated carrier signals which are transmitted through the channel (15);

the decoder (105) comprising a demodulator (113) for demodulating the received transmitted modulated carrier signals, the decoder (105) further comprising a frequency de-interleaver (137) which operates in the reverse manner to the frequency interleaver (37);

at least one of the multi-stage channel sub-encoders (31) comprising:

at least one internal encoder ($34_1\, 34_2$) which performs an internal block coding constituted of a series of codeword blocks, each codeword being a series of data bits, at least one external encoder ($35_1\, 35_2$) which performs an external coding of the codeword blocks delivered to it by the internal encoder, the internal and external codings being concatenated to divide a binary protection redundancy between the internal encoder and the external encoder;

the decoder (105) further comprising a plurality of multi-stage channel sub-decoders (112) each of which includes at least one multi-stage channel sub-decoder comprising:

at least one internal decoder which performs an internal block decoding corresponding but in the reverse manner to the internal coding performed by the internal encoder, at least one external decoder which performs an external block decoding corresponding but in the reverse manner to the external coding performed by the internal encoder;

the decoder (105) further including detectors ($40_1, 40_2$) which performs a detection on said partitioning levels of the constellation.

2. System as claimed in claim 1, wherein the encoder (5) comprises a time-division interleaver (37a) and the decoder (105) comprises a time-division interleaver.

3. System as claimed in claim 1, wherein each codeword of the internal encoder constitutes a symbol for the external encoder.

4. System as claimed in claim 1, wherein the coded modulation provided by the encoder is a phase shift keying (PSK) modulation or quadrature amplitude modulation (QAM), and the decoder demodulates the received signals transmitted according to, respectively, the phase shift keying modulation or the quadrature amplitude modulation.

5. System as claimed in claim 1, wherein the encoder produces a combination of at least two different coded modulations, and the decoder (105) demodulates the combination of the two coded modulations.

6. System as claimed in claim 3, wherein the encoder produces a combination of at least two different coded modulations, and the decoder (105) demodulates the combination of the two encoded modulations.

7. System as claimed in claim 1, wherein at least one internal decoder ($45_1, 45_2$) creates bit deletions or bit sequence deletions or both, and wherein at least one external decoder ($44_1, 44_2$) corrects said deletions.

8. System as claimed in claim 3, wherein at least one internal decoder ($45_1, 45_2$) creates bit deletions or bit sequence deletions or both, and wherein at least one external decoder ($44_1, 44_2$) corrects said deletions.

9. System as claimed in claim 5, wherein at least one internal decoder ($45_1, 45_2$) creates bit deletions or bit sequence deletions or both, and wherein at least one external decoder ($44_1, 44_2$) corrects said deletions.

10. System as claimed in claim 6, wherein at least one internal decoder ($45_1, 45_2$) creates bit deletions or bit sequence deletions or both, and wherein at least one external decoder (44$_1$, 44$_2$) corrects said deletions.

11. A transmitter for use in a digital signal transmission system which operates by coded modulation of a constellation comprising:
- an encoder comprising a plurality (12) of multi-stage channel sub-encoders (31); each multi-stage channel sub-encoder (31) combining a channel coding, for protecting data bits to transmit, with the coded modulation, the whole channel coding being subdivided and assigned to several successive partitioning levels of the constellation, each multi-stage channel sub-encoder (31) further comprising an assigning element (32) for assigning the encoded signals to one partitioning level and for supplying symbols which modulate a carrier, each multi-stage channel sub-encoder (31) having its own carrier with a unique carrier frequency;
- a frequency interleaver (37) for interleaving together said symbols from all the sub-encoders (31) to form a modulating signal;
- a modulator (13) for receiving the carriers and modulating signal and for modulating the carriers in the modulator (13), the carrier modulation being performed according to an orthogonal carrier frequency-division multiplexing technique for obtaining modulated carrier signals which are transmitted;
- at least one of the multi-stage channel sub-encoders (31) comprising:
  - at least one internal encoder (34$_1$ 34$_2$) which performs an internal block coding constituted of a series of codeword blocks, each codeword being a series of data bits,
  - at least one external encoder (35$_1$ 35$_2$) which performs an external coding of the codeword blocks delivered to it by the internal encoder, the internal and external codings being concatenated to divide a binary protection redundancy between the internal encoder and the external encoder.

12. Transmitter as claimed in claim 11, wherein the encoder (5) comprises a time-division interleaver (37a).

13. Transmitter as claimed in claim 11, wherein each codeword of the internal encoder constitutes a symbol for the external encoder.

14. Transmitter as claimed in claim 11, wherein the coded modulation provided by the encoder is a phase shift keying (PSK) modulation or quadrature amplitude modulation (QAM).

15. Transmitter as claimed in claim 11, wherein the encoder produces a combination of at least two different coded modulations.

16. Transmitter as claimed in claim 13, wherein the encoder produces a combination of at least two different coded modulations.

17. Receiver for use in a digital signal transmission system which operates by coded modulation of a constellation, said coded modulation having been performed by an encoder comprising a plurality (12) of multi-stage channel sub-encoders (31); each multi-stage channel sub-encoder (31) combining a channel coding, for protecting data bits to transmit, with the coded modulation, the whole channel coding being subdivided and assigned to several successive partitioning levels of the constellation, each multi-stage channel sub-encoder (31) further comprising an assigning element (32) for assigning the encoded signals to one partitioning level and for supplying symbols which modulate a carrier, each multi-stage channel sub-encoder (31) having its own carrier with a unique carrier frequency; a frequency interleaver (37) for interleaving together said symbols from all the sub-encoders (31) to form a modulating signal; a modulator (13) for receiving the carriers and modulating signal and for modulating the carriers in the modulator (13), the carrier modulation being performed according to an orthogonal carrier frequency-division multiplexing technique for obtaining modulated carrier signals which are transmitted; at least one of the multi-stage channel sub-encoders (31) comprising: at least one internal encoder (34$_1$ 34$_2$) which performs an internal block coding constituted of a series of codeword blocks, each codeword being a series of data bits, at least one external encoder (35$_1$ 35$_2$) which performs an external coding of the codeword blocks delivered to it by the internal encoder, the internal and external codings being concatenated to divide a binary protection redundancy between the internal encoder and the external encoder; said receiver comprising:
- a decoder (105) comprising a demodulator (113) for demodulating the received transmitted modulated carrier signals, the decoder (105) further comprising a frequency de-interleaver (137) which operates in the reverse manner to the frequency interleaver (37);
- the decoder (105) further comprising a plurality of multi-stage channel sub-decoders (112) each of which includes at least one multi-stage channel sub-decoder comprising:
- at least one internal decoder which performs an internal block decoding corresponding but in the reverse manner to the internal coding performed by the internal encoder,
- at least one external decoder which performs an external block decoding corresponding but in the reverse manner to the external coding performed by the internal encoder;
- the decoder (105) further including detectors (40$_1$, 40$_2$) which performs a detection on said partitioning levels of the constellation.

18. Receiver as claimed in claim 16, wherein the decoder (105) comprises a time-division interleaver.

19. Receiver as claimed in claim 16, wherein the decoder demodulates the received signals transmitted according to phase shift keying modulation or quadrature amplitude modulation.

20. Receiver as claimed in claim 16, wherein the decoder (105) demodulates the combination of two coded modulations.

21. Receiver as claimed in claim 16, wherein at least one external decoder (44$_1$, 44$_2$) corrects bit deletions or bit sequence deletions or both created by the internal decoder (45$_1$, 45$_2$).

* * * * *